(12) United States Patent
Ghoneim et al.

(10) Patent No.: US 8,214,106 B2
(45) Date of Patent: Jul. 3, 2012

(54) ADAPTIVE SUSPENSION CONTROL FOR A MOTOR VEHICLE

(75) Inventors: Youssef Ghoneim, Rochester, MI (US); Veit Held, Bensheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 350 days.

(21) Appl. No.: 12/415,419

(22) Filed: Mar. 31, 2009

(65) Prior Publication Data

US 2009/0254249 A1  Oct. 8, 2009

(30) Foreign Application Priority Data

Apr. 2, 2008  (EP) .................................... 08006738

(51) Int. Cl.
*B60G 17/018* (2006.01)
(52) U.S. Cl. .................................................. 701/37
(58) Field of Classification Search ............. 701/48, 701/52, 36, 37, 38, 41; 180/65.6, 89.14; 280/5.507
See application file for complete search history.

(56) References Cited

U.S. PATENT DOCUMENTS

| | | | |
|---|---|---|---|
| 4,830,394 A | 5/1989 | Tanaka et al. | |
| 5,524,079 A * | 6/1996 | Ishida et al. | 701/42 |
| 6,879,898 B2 | 4/2005 | Ghoneim et al. | |
| 7,747,368 B2 | 6/2010 | Tomida et al. | |
| 2004/0015279 A1 | 1/2004 | Barron et al. | |
| 2004/0094929 A1* | 5/2004 | Ribi | 280/124.161 |
| 2004/0133326 A1 | 7/2004 | Ghoneim et al. | |
| 2005/0234620 A1 | 10/2005 | Roll et al. | |
| 2008/0086248 A1* | 4/2008 | Lu et al. | 701/41 |
| 2008/0243334 A1* | 10/2008 | Bujak et al. | 701/37 |

FOREIGN PATENT DOCUMENTS

| | | |
|---|---|---|
| JP | 58056907 A | 4/1983 |
| WO | 2006126342 A1 | 11/2006 |

* cited by examiner

*Primary Examiner* — Faye M. Fleming
(74) *Attorney, Agent, or Firm* — Ingrassia Fisher & Lorenz, P.C.

(57) ABSTRACT

A suspension control system for a motor vehicle having a chassis and wheels connected to the chassis by a suspension system the stiffness of which is variable under the control of the suspension control system comprises a controller adapted to modify autonomously the stiffness of the suspension system depending on a current state of motion of the vehicle.

13 Claims, 2 Drawing Sheets

ADAPTIVE SUSPENSION CONTROL FOR A MOTOR VEHICLE

CROSS-REFERENCE TO RELATED APPLICATION

This application claims priority to European Patent Application No. 08006738.2-1264, filed Apr. 2, 2008, which is incorporated herein by reference in its entirety.

TECHNICAL FIELD

The present invention relates to a suspension control system for a motor vehicle which is capable of varying the suspension stiffness in a moving vehicle and to a method of controlling such a suspension system.

BACKGROUND

U.S. Pat. No. 6,879,898 B2 discloses a chassis control system for a motor vehicle in which the stiffness of a suspension system is variable according to the driver's wish. In order to prevent a safety hazard which might arise if the driver selects a stiffness setting which is ill-suited for the current state of motion of the vehicle, this conventional suspension system monitors the state of motion of the vehicle and refuses to change the stiffness settings if these are found not to be appropriate for the current state of motion of the vehicle. Such a suspension control system enables the driver to adapt the behavior of the suspension system to his personal taste. A driver fancying a sporty driving style may want a rather high stiffness of the suspension in order to improve the grip of the vehicle on the road surface, so that the movement of the vehicle can be controlled precisely, even if curves are driven through at high speed. At another time, the same driver may prefer a softer setting of the suspension system, although this may require him to go through curves at a moderate speed. In any case, any change in the settings of the suspension system requires a conscious decision by the driver. Since the driver must continuously heed the traffic around him, it is not practical for him to repeat this decision at a high rate. The state of motion of the vehicle will therefore change many times from cornering to straight line driving, from cruising to accelerating or braking, etc., without the driver being able to adapt the suspension settings to each of these states. In consequence, if the driver has chosen a soft setting for the suspension system, it is maybe very comfortable for cruising, but in case of fast braking or accelerating or going fast through a narrow curve, the vehicle may become difficult to handle. If the driver has selected a stiff setting in order to prepare for eventual fast cornering maneuvers, comfort is reduced while the vehicle is cruising.

In view of the foregoing, it is at least one object of the present invention is to remedy this defect and to provide a suspension control system and a control method which allowed to combine excellent cornering maneuverability with a high degree of comfort. In addition, other objects, desirable features, and characteristics will become apparent from the subsequent summary and detailed description, and the appended claims, taken in conjunction with the accompanying drawings and this background.

SUMMARY

This at least one object, other objects, desirable features, and characteristics, are achieved by a suspension control system for a motor vehicle having a chassis and wheels connected to the chassis by a suspension system the stiffness of which is variable under the control of a suspension control system, wherein a controller of this control system is adapted to modify autonomously the stiffness of the suspension system depending on a current state of motion of the vehicle. Since the suspension control system will always use a first degree of stiffness (e.g., when cruising and another degree of stiffness, or when cornering), a driver will usually not notice that the stiffness is being switched, since he will never experience cornering with the first degree of stiffness. The driver's experience will be that of a vehicle suspension which combines a high degree of comfort while cruising with exceptional maneuverability while cornering or in transient situations.

In order to recognize cornering, the controller is preferably connected to a lateral acceleration sensor and is adapted to distinguish between a high lateral acceleration state of motion and a low lateral acceleration state of motion and to set a higher stiffness of the suspension system in the high lateral acceleration state than in the low lateral acceleration state.

Similarly, the controller may be connected to a yaw rate sensor and be adapted to distinguish between a high yaw rate state of motion and a low yaw rate state of motion and to set a higher stiffness of the suspension system in the high yaw rate state than in the low yaw rate state.

The controller may also be adapted to estimate the side-slip rate of the vehicle, to distinguish between a high side-slip rate state of motion and a low side-slip rate state of motion and to set a higher stiffness of the suspension system in the high side-slip rate state than in the low sideslip rate state.

Preferably, side-slip rate estimation may be based on yaw rate data from the yaw rate sensor and lateral acceleration data from the lateral acceleration sensor.

Further, the controller may be connected to a longitudinal acceleration sensor and be adapted to distinguish between a high longitudinal acceleration state of motion and a low longitudinal acceleration state of motion and to set a higher stiffness of the suspension system in the high longitudinal acceleration state than in the low longitudinal acceleration state, in order to provide a tighter grip on a road when accelerating.

Similarly, the controller may be adapted to distinguish between a positive longitudinal acceleration state of motion and a negative longitudinal acceleration state of motion (i.e., braking), and to set a higher stiffness of the suspension system in the negative longitudinal acceleration state than in the positive longitudinal acceleration state.

When the vehicle is moving slowly (e.g., when maneuvering into or out of a parking box), it may be appropriate to have a stiffer setting of the suspension system than when travelling at a normal speed for urban or overland traffic. Therefore, the controller may also be adapted to distinguish between a high forward speed state of motion and a low (including negative) forward speed state of motion and to set a higher stiffness of the suspension system in the high forward speed state than in the low forward speed state.

In order to recognize transient situations (i.e., situations in which the direction of the vehicle is changing quickly—although for a short time the vehicle may be moving straight ahead), it is preferred that the controller is connected to a steering wheel angle sensor and is adapted to distinguish between a high steering wheel angular velocity state of motion and a low steering wheel angular velocity state of motion. In a transient state corresponding to the high steering wheel angular velocity, the stiffness of the suspension system should be set higher than in the low steering wheel angular velocity state.

For the same purpose, the controller may be adapted to determine a time derivative of the yaw rate, to distinguish between a high yaw rate derivative state and a low yaw rate derivative state and to set a higher stiffness of the suspension system in the high yaw rate derivative state than in the low yaw rate derivative state.

Preferably, the states are assigned a plurality of discrete stiffness values of the suspension system. Although the suspension system as such might allow for a continuous variation of the stiffness, selecting discrete values is preferred, because if there are other parameters of the vehicle chassis which are continuously adjusted according to the state of motion of the vehicle (e.g., the distribution of engine torque to front and rear wheels, or the relation between steering wheel angle and the angle of the front wheels steered by it), the number of possible parameter combinations is finite. This enables the vehicle designer to check each combination of parameters for operational safety or other criteria, and to rule out selection of an unfavorable parameter combination.

It is further preferred that the controller stores at least to maps for assigning a stiffness value to each state and that it has a user interface for allowing a user to select between said at least two maps. In this way, the user still has a possibility of adapting the behavior of the vehicle to his personal taste by selecting e.g. between a map optimized for comfort and another optimized for sporty driving.

A method is also provided for controlling the stiffness of a suspension system in a motor vehicle that comprises the steps of determining a current state of motion of the vehicle, whenever a change of a state of motion is observed, setting the stiffness of the suspension system to a value associated to the current state of motion.

The embodiments of the invention may be embodied by a data processor program product comprising a data carrier in which program instructions for enabling a data processor to form the controller of the suspension control system described above or to carry out the method described above are recorded in machine readable form.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
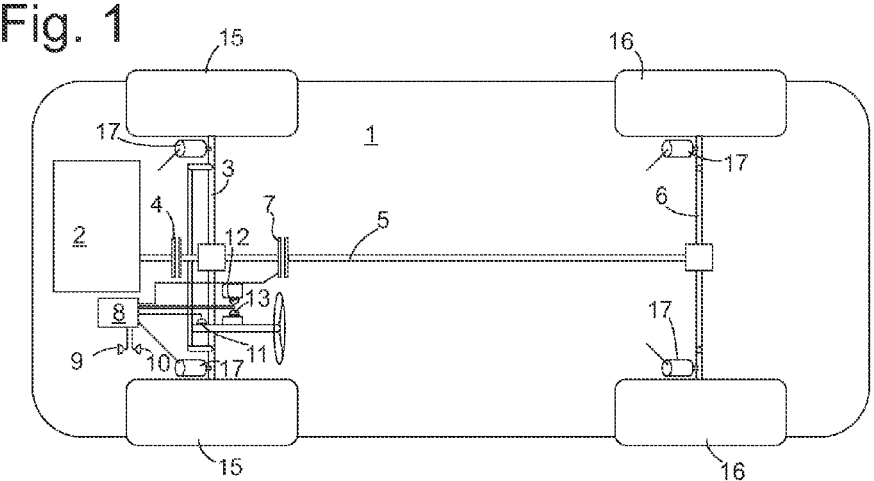
FIG. 1 is a block diagram of a motor vehicle equipped with an adaptive suspension control according to an embodiment of the invention.

FIG. 1 is a schematic block diagram of a motor vehicle embodying an embodiment of the present invention. The vehicle has a combustion engine 2 which drives wheels 15 of a front axle 3 via a first clutch 4. In a drive shaft 5 between front axle 3 and rear axle 6, a second clutch 7 is provided. The second clutch 7 is placed under control of a microprocessor-based controller circuit 8. If the second clutch 7 is opened, the vehicle is driven by the wheels 15 alone; if it is closed, it is additionally driven by rear wheels 16. The ratio between the torque applied to the wheels 15 (e.g., front wheels) and that applied to the rear wheels 16 can be varied by the controller circuit 8.

Shock absorbers 17 are provided near the wheels 15, 16 on front axle 3 and rear axle 6. The stiffness of the shock absorbers 17 is variable under control of the controller circuit 8.

The controller circuit 8 has a variety of sensors connected to it, such as an acceleration sensor 9 for detecting longitudinal and lateral acceleration of the vehicle 1, a yaw rate sensor 10, a steering wheel angle sensor 11 or an accelerator pedal sensor 12. The accelerator pedal sensor 12 may replaced by an intake air throttle sensor, not shown, or by a fuel supply rate signal from an electronic engine controller, not shown, since throttle position or fuel rate are usually directly controlled based on the accelerator pedal position.

Further, a brake sensor 13 is provided. This sensor may detect a position of a brake pedal, or it may be a pressure sensor for detecting the pressure of a brake fluid which is used for driving wheel brakes, not shown, at wheels 15, 16, in a manner familiar to one of ordinary skill in the art.

The operation of the controller circuit 8 will be explained referring to the flow charts of FIG. 2 and FIG. 3. These figures illustrate two parts of a control process which is carried out repeatedly by the controller circuit 8, at regular time intervals or triggered by a substantial change of a quantity related to the motion of the vehicle, as long as the vehicle is moving.

In a first step S1, the controller circuit 8 checks whether any electronic stabilizing system which may exist in the vehicle 1, such as a conventional ABS or ESP system is actively interfering with the vehicle controls. If it is, the process of FIG. 2 is aborted, in order to avoid any undesirable interaction with the electronic stabilizing system, and will be started or triggered again at a later instant or as soon as the stabilizing system goes inactive.

Figure 2:
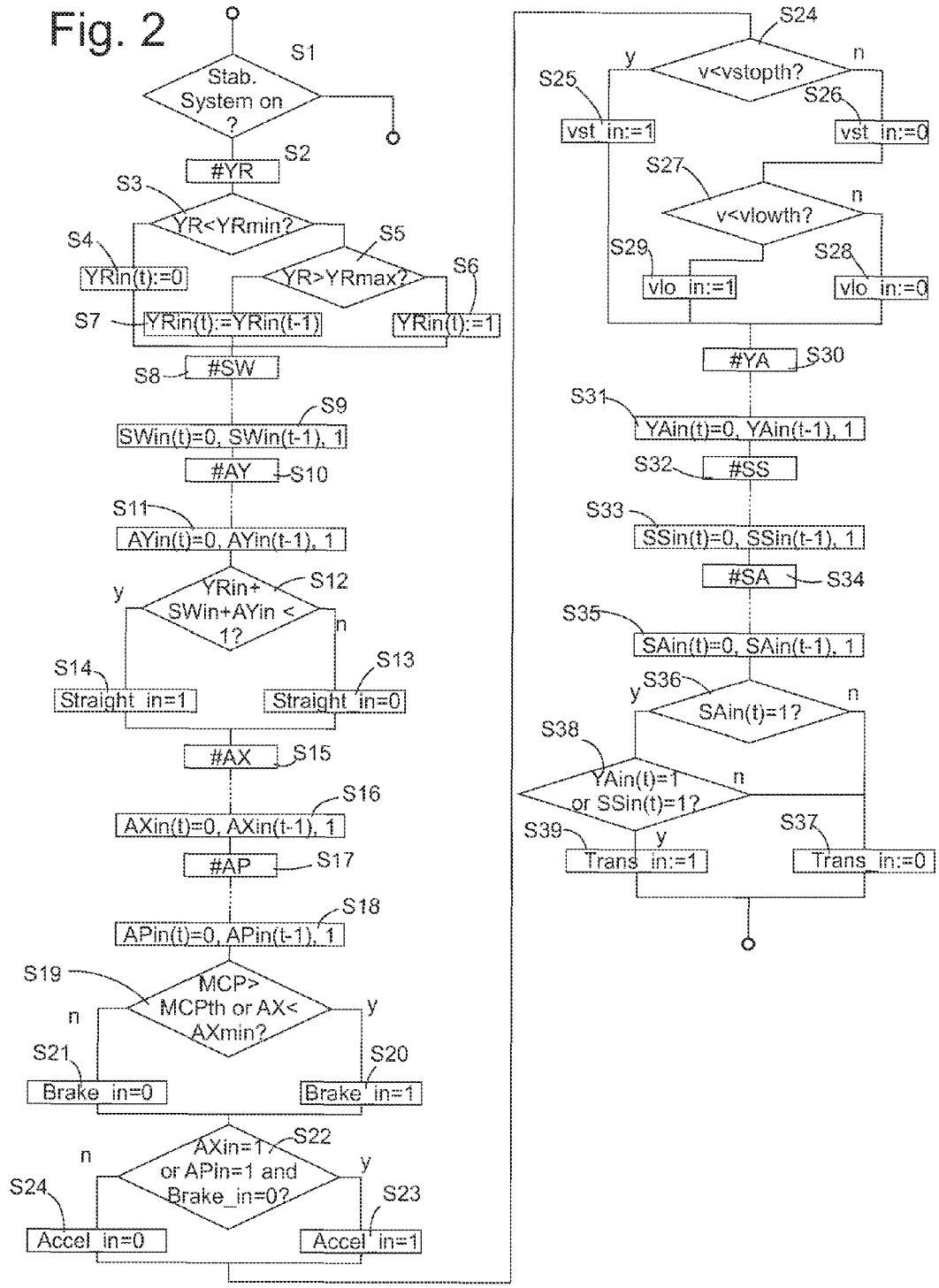
FIG. 2 is a flow chart of a first part of a control process carried out by the controller of the vehicle of FIG. 1.

The process of FIG. 2 measures a variety of vehicle motion-related quantities and converts these into binary indices. The way in which this is done is similar for many quantities and will be explained here only once referring to the yaw rate YR from yaw rate sensor 10, it being understood that a similar process is carried out mutatis mutandis for other quantities which will be mentioned later in this description.

In step S2, controller circuit 8 receives a current measured value of the yaw rate YR from yaw rate sensor 10. In step S3, this value YR is compared to a predetermined low threshold YRmin. If YR is found to be below this threshold, step S4 sets the present value of the yaw rate index YRin(t) equal to zero. If YR is above the first threshold, it is compared to a second, higher threshold YRmax in step S5. If YR exceeds this second threshold, the index YRin(t) is set to 1 in step S6. If YR is below the second threshold YRmax, the index YRin(t) is maintained at the value YRin(t−1) it received in a previous iteration of the process (S7).

In a similar way, a steering wheel angle SW is fetched from steering wheel angle sensor 11 in step S8, and, based on a comparison with two thresholds, the present value of a steering wheel index SWin(t) is set to 0, to 1, or is left identical to its previous value SWin(t−1) in step S9.

In the same way, the lateral acceleration AY is read from acceleration sensor 9, and a lateral acceleration index AYin(t) is set according to this reading in step S11.

Step S12 checks whether any of the indices YRin, SWin, AYin determined above is 1, indicating that the vehicle is going through a curve. If so, a straight line driving index Straight_in is set to 0 (S13), if not, it is set to 1 (S14).

In step S15, the current longitudinal acceleration AX is fetched from acceleration sensor 9, and a longitudinal acceleration index AXin(t) is derived there from as described above for YR (S16). In the same way, an index APin(t) indicating whether the accelerator pedal is depressed far enough to accelerate the vehicle is determined in steps S17, S18. An index having the same significance might alternatively be derived from the position of an intake air throttle or from the rate of fuel supply to the engine, too.

Step S19 checks whether the vehicle is in a braking state or not by either comparing the longitudinal acceleration AX of step S15 to a threshold AXmin or by comparing the brake fluid pressure MCP to a threshold MCPth. If one of these thresholds is exceeded, a braking index Brake_in is set to 1 (S20), else to 0 (S21).

If either AXin=1, indicating a substantial acceleration of the vehicle, or APin=1, indicating imminent acceleration, and Brake_in=0, an acceleration index Accel_in is set to 1 (S23), else to 0 (S24).

Based on a comparison of the vehicle velocity v with a very low threshold vstopth, a stop index vst_in is set to 1 (S25), indicating that the vehicle is moving, or to 0 (S26), indicating that is practically standing still. If it is determined that the vehicle is moving, its speed v is compared to another threshold vlowth amounting to a few kilometer per hour. If the threshold is exceeded, indicating that the vehicle is moving in a normal traffic flow, the index vlo_in is set to 0 (S28). If v is below vlowth it is likely that the vehicle is carrying out a difficult maneuver such as moving into and out of a park box, and vlo_in is set to 1 (S29).

In step S30, the yaw acceleration YA (i.e., the time derivative of the yaw rate YR measured in S2, is calculated), and a yaw acceleration index YAin(t) is derived based on comparison with two thresholds in step S31. Step S32 calculates the side-slip rate SS of the vehicle as follows:

$$SS = AY - YR*v$$

This is based on the lateral acceleration AY and the yaw rate YR measured in steps S10 and S2, respectively. In the same way as for the other quantities mentioned above, an associated index SSin(t) is obtained in step S33 by comparison with two thresholds. The index SSin is 0 if there is no substantial side-slip, and it is 1 if there is.

Step S34 calculates the time derivative SA of the steering wheel angle SW. In step S35, a steering wheel velocity index SAin(t) is set to 0 if there is no substantial movement of the steering wheel and to 1 if there is.

If SAin(t) is 0 in step S36 (i.e., if the steering wheel is turned slowly or not at all), it is assumed that the vehicle is not in a transient state. This is reflected by transient index Trans_in being set to 0 in S37. If SAin(t) is 1, step S38 further checks whether at least one of indices YAin(t) or SSin(t) is 1. If this condition is fulfilled, the vehicle is assumed to be in a transient state (i.e., Trans_in is set to 1 in S39).

Figure 3:
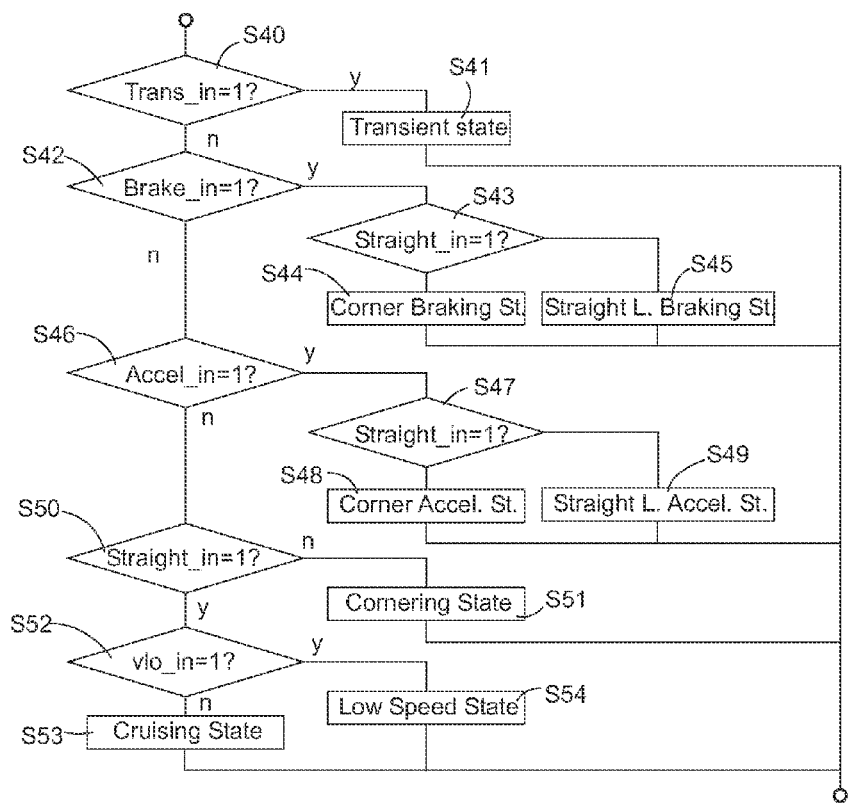
FIG. 3 is a flow chart of a second part of the control process.

The state of motion of the vehicle thus having been evaluated, the controller proceeds to the second part of the process, illustrated in FIG. 3. If the transient index Trans_in is found to be 1 in S40, the stiffness of the shock absorbers 17 is set to a high value associated to the transient state in S41.

If the vehicle is not found to be in the transient state, the brake index Brake_in is checked in step S42. If it is 1, the straight line driving index Straight_in is checked in S43. If it is 1, it is concluded that the vehicle is in a cornering braking state (i.e., it is braking while going through a curve), in S44, and a stiffness value associated to this state is set in the shock absorbers 17.

If Straight_in=0 the vehicle must be in a straight line braking state, and the shock absorbers 17 are set accordingly in S45.

If the vehicle is not braking, the method checks for an accelerating state in S46. If Accel_in=1 the straight line driving index Straight_in is checked in step S47, and according to the value thereof the vehicle is determined to be in a cornering accelerating state (S48) or in a straight line accelerating state (S49).

If the vehicle is not accelerating, either, Straight_in is checked again in step S50, and if it is 1, an appropriate stiffness of the shock absorbers 17 for a cornering state is set in S51.

If the vehicle is not cornering, the speed index vlo_in is referred to in S52 in order to decide whether the vehicle is in a cruising state S53 or in a low speed state S54.

Table 1 below gives examples of maps by which stiffness values of the shock absorbers can be assigned to the various vehicle motion states determined above. Numbers in table 1 are not quantitative; it is assumed that four different stiffness values referred to as "1" to "4" can be set in the shock absorbers, and that the stiffness increases from "1" to "4". Map A is comfort-oriented; in the cruise mode, the stiffness is set to "1" (i.e., very soft). A low intermediate stiffness "2" is predetermined for low speed and straight line acceleration states, whereas all cornering states, straight line braking and transient states have stiffness "3". Map B is more suitable for a sporty driving style, since the shock absorbers are generally set to a higher stiffness than according to map A. Again, the lowest stiffness, "2", is selected in the cruise mode, and the highest, "4", in the transient, cornering and accelerated cornering states.

TABLE 1

| State | A | B | C1 | C2 | C3 |
|---|---|---|---|---|---|
| Cruise | 1 | 2 | 1 | 1 | 2 |
| Accel. straight line | 2 | 2 | 1 | 2 | 3 |
| Accel. Corner | 3 | 4 | 2 | 2 | 3 |
| Braking straight line | 3 | 3 | 2 | 2 | 3 |
| Braking corner | 3 | 3 | 2 | 2 | 3 |
| Cornering | 3 | 4 | 2 | 2 | 3 |
| Low speed | 2 | 3 | 2 | 2 | 3 |
| Transient | 3 | 4 | 2 | 2 | 3 |

If the controller circuit 8 has a user interface where the driver can specify whether he prefers a comfortable or a sporty driving style, different maps may be used for associating stiffness settings to the various motion states of the vehicle. If the driver selects a comfortable operation mode embodied by map C1, the shock absorbers are set to be soft wherever appropriate (i.e. stiffness "1" is adopted for cruise and straight line accelerating states), whereas all other states are assigned stiffness "2". If the driver wants an intermediate setting, map C2 may be used, which selects the softest setting "1" for the shock absorbers only in the cruise state, and an intermediate value "2" in all others. The shock absorbers are controlled generally to be stiffer by using map C3, which sets stiffness "2" for the cruise mode and "3" for all others.

The process described with respect to FIG. 2 and FIG. 3 distinguishes between each of the various states listed in Table 1. Depending on how the different stiffness values are assigned to the various states, there may be pairs of states between which is not necessary to distinguish. In that case, a skilled person will easily know which of the method steps of FIG. 2 and FIG. 3 may be cancelled.

According to a preferred embodiment, the controller circuit 8 uses the indices obtained in the process of FIG. 2 and FIG. 3 also for controlling clutch the second 7. While the second clutch 7 is open in the cruising state, it may be closed in a cornering state in order to reduce oversteer or understeer of the vehicle. The degree of closing and, hence, ratio of distribution of engine torque to front wheels 15 and rear wheels 16 may be different for cornering, accelerated cornering and braking cornering states. Further, the second clutch 7 may be closed in the straight line accelerating state, in order to prevent spinning of the tires in case of high acceleration.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A system for controlling a suspension of a motor vehicle, comprising:
    a chassis;
    a wheel;
    a suspension system coupling the wheel and the chassis;
    a lateral acceleration sensor, adapted to distinguish between a high lateral acceleration state of motion and a low lateral acceleration state of motion; and
    a suspension control system coupled to the suspension system and adapted to control a variable stiffness of the suspension system, the suspension control system comprising a controller coupled to the lateral acceleration sensor and adapted to autonomously modify the variable stiffness of the suspension system to set a higher stiffness of the suspension system in the high lateral acceleration state of motion as compared to the low lateral acceleration state of motion responsive to the lateral acceleration sensor.

2. The system of claim 1, wherein the controller is coupled to a yaw rate sensor, adapted to distinguish between a high yaw rate state of motion and a low yaw rate state of motion, and adapted to set a higher stiffness of the suspension system in the high yaw rate state as compared to the low yaw rate state.

3. A system for controlling a suspension of a motor vehicle, comprising:
    a chassis;
    a wheel;
    a suspension system coupling the wheel and the chassis; and
    a suspension control system adapted to control a variable stiffness of the suspension system, the suspension control system comprising a controller adapted to autonomously modify the variable stiffness of the suspension system depending on a current state of motion of the motor vehicle;
    wherein the controller is also adapted to estimate a side-slip rate of the motor vehicle to distinguish between a high side-slip rate state of motion and a low side-slip rate state of motion and further adapted to set a higher stiffness of the suspension system in the high side-slip rate state as compared to the low side-slip rate state.

4. The system of claim 3, wherein the controller is adapted to estimate the side-slip rate from a yaw rate measured by a yaw rate sensor and a lateral acceleration measured by a lateral acceleration sensor.

5. The system of claim 1, wherein the controller is coupled to a longitudinal acceleration sensor and adapted to distinguish between a high longitudinal acceleration state of motion and a low longitudinal acceleration state of motion and further adapted to set a higher stiffness of the suspension system in the high longitudinal acceleration state as compared to the low longitudinal acceleration state.

6. The system of claim 1, wherein the controller is coupled to a longitudinal acceleration sensor and adapted to distinguish between a positive longitudinal acceleration state of motion and a negative longitudinal acceleration state of motion and further adapted to set a higher stiffness of the suspension system in the negative longitudinal acceleration state as compared to the positive longitudinal acceleration state.

7. The system of claim 1, wherein the controller is adapted to distinguish between a high forward speed state of motion and a low forward speed state of motion and further adapted to set a higher stiffness of the suspension system in the low forward speed state as compared to the high forward speed state.

8. The system of claim 1, wherein the controller is connected to a steering wheel angle sensor and adapted to distinguish between a high steering wheel angular velocity state of motion and a low steering wheel angular velocity state of motion and further adapted to set a higher stiffness of the suspension system in the high steering wheel angular velocity state as compared to the low steering wheel angular velocity state.

9. The system of claim 1, wherein the controller is adapted to determine a time derivative of a yaw rate to distinguish between a high yaw rate derivative state and a low yaw rate derivative state and further adapted to set a higher stiffness of the suspension system in the high yaw rate derivative state as compared to the low yaw rate derivative state.

10. The system claim 1, wherein a state is assigned to one of a plurality of discrete stiffness values of the suspension system.

11. The system of claim 1, wherein the controller is adapted to store at least two maps for assigning a stiffness value to the state assigned to one of the plurality of discrete stiffness values of the suspension system and further adapted to receive a user input for allowing the user to select between the at least two maps.

12. A method for controlling a stiffness of a suspension system in a motor vehicle, comprising the steps of
    measuring a lateral acceleration of the motor vehicle;
    measuring a yaw rate of the motor vehicle;
    determining a current state of motion of the motor vehicle by estimating a side-slip rate from the lateral acceleration rate and yaw rate; and
    autonomously setting the stiffness of the suspension system to a value associated to the current state of motion when a change from a prior state of motion is determined.

13. A computer readable medium embodying a program product, said program product comprising:
    a stiffness control program for controlling a stiffness of a suspension in a motor vehicle, the stiffness control program configured to:
    determine a current state of motion of the motor vehicle by distinguishing between a high yaw rate state of motion and a low yaw rate state of motion; and
    autonomously set the stiffness of a suspension system to a higher stiffness value associated to the current state of motion when a change from a prior low yaw rate state of motion to a high yaw rate state of motion is determined.

* * * * *